(12) United States Patent
Pisz

(10) Patent No.: US 7,441,192 B2
(45) Date of Patent: Oct. 21, 2008

(54) PROGRAMMING, SELECTING, AND PLAYING MULTIMEDIA FILES

(75) Inventor: James T. Pisz, Huntington Beach, CA (US)

(73) Assignee: Toyota Motor Sales U.S.A., Inc., Torrance, CA (US)

( * ) Notice: Subject to any disclaimer, the term of this patent is extended or adjusted under 35 U.S.C. 154(b) by 586 days.

(21) Appl. No.: 10/310,402

(22) Filed: Dec. 5, 2002

(65) Prior Publication Data

US 2003/0110057 A1 Jun. 12, 2003

Related U.S. Application Data

(60) Provisional application No. 60/338,440, filed on Dec. 6, 2001.

(51) Int. Cl.
G06F 3/16 (2006.01)
(52) U.S. Cl. ...................................... 715/727
(58) Field of Classification Search ................ 715/727, 715/721
See application file for complete search history.

(56) References Cited

U.S. PATENT DOCUMENTS

| | | |
|---|---|---|
| 4,845,636 A | 7/1989 | Walker |
| 4,872,541 A | 10/1989 | Hayashi |
| 5,327,066 A | 7/1994 | Smith |
| 5,557,541 A | 9/1996 | Schulhof et al. |
| 5,572,442 A | 11/1996 | Schulhof et al. |
| 5,594,661 A | 1/1997 | Bruner et al. |
| 5,619,570 A | 4/1997 | Tsutsui |
| 5,625,608 A | 4/1997 | Grewe et al. |
| 5,633,839 A | 5/1997 | Alexander et al. |
| 5,636,276 A | 6/1997 | Brugger et al. |
| 5,644,714 A | 7/1997 | Kikinis |
| 5,654,516 A | 8/1997 | Tashiro et al. |
| 5,675,734 A | 10/1997 | Hair |
| 5,721,815 A | 2/1998 | Ottesen et al. |

(Continued)

FOREIGN PATENT DOCUMENTS

JP 07-244966 9/1995

(Continued)

OTHER PUBLICATIONS

Daniel F. Stubbs & Neil W. Webre, "Data Structures with Abstract Data Types and Pascal", 1985, pp. 45-59.*

(Continued)

*Primary Examiner*—David Wiley
*Assistant Examiner*—Le Nguyen
(74) *Attorney, Agent, or Firm*—McDermott Will & Emery LLP

(57) ABSTRACT

Systems and methods for providing a user-definable multimedia or digital library are disclosed. Also disclosed are systems and methods for selecting and playing multimedia or digital files from within the library. The selection and playback systems and methods involve a limited number of user activated buttons, which are implemented both for mapping directly to storage locations of particular multimedia or digital files, and for accepting and playing a multimedia or digital file once selected. The limited number of buttons required for the various features of these systems and methods provide vehicle operators, such as automobile drivers, with a safe mechanism and procedure for retrieving and playing customized play lists and particular songs while driving.

33 Claims, 3 Drawing Sheets

U.S. PATENT DOCUMENTS

| | | | |
|---|---|---|---|
| 5,732,216 | A | 3/1998 | Logan et al. |
| 5,732,324 | A | 3/1998 | Rieger |
| 5,742,229 | A | 4/1998 | Smith |
| 5,761,529 | A * | 6/1998 | Raji et al. ............... 710/4 |
| 5,781,889 | A | 7/1998 | Martin et al. |
| 5,790,423 | A | 8/1998 | Lau et al. |
| 5,790,935 | A | 8/1998 | Payton |
| 5,812,643 | A | 9/1998 | Schelberg, Jr. et al. |
| 5,815,471 | A | 9/1998 | Mince et al. |
| 5,841,979 | A | 11/1998 | Schulhof et al. |
| 5,860,068 | A | 1/1999 | Cook |
| 5,870,710 | A | 2/1999 | Ozawa et al. |
| 5,884,016 | A | 3/1999 | Allen et al. |
| 5,909,638 | A | 6/1999 | Allen |
| 5,914,941 | A | 6/1999 | Janky |
| 5,926,624 | A | 7/1999 | Katz et al. |
| 5,928,327 | A | 7/1999 | Wang et al. |
| 5,931,901 | A | 8/1999 | Wolfe et al. |
| 5,943,046 | A | 8/1999 | Cave et al. |
| 5,949,411 | A | 9/1999 | Doerr et al. |
| 5,953,005 | A | 9/1999 | Liu |
| 5,956,716 | A | 9/1999 | Kenner et al. |
| 5,959,945 | A | 9/1999 | Klieman |
| 5,966,440 | A | 10/1999 | Hair |
| 5,969,283 | A | 10/1999 | Looney et al. |
| 5,990,884 | A | 11/1999 | Douma et al. |
| 6,021,390 | A | 2/2000 | Satoh et al. |
| 6,025,868 | A | 2/2000 | Russo |
| 6,029,195 | A | 2/2000 | Herz |
| 6,104,334 | A | 8/2000 | Allport |
| 6,128,551 | A | 10/2000 | Davis et al. |
| 6,133,908 | A | 10/2000 | Scibora et al. |
| 6,141,684 | A | 10/2000 | McDonald et al. |
| 6,144,702 | A | 11/2000 | Yurt et al. |
| 6,151,631 | A | 11/2000 | Ansell et al. |
| 6,151,634 | A | 11/2000 | Glaser et al. |
| 6,154,772 | A | 11/2000 | Dunn et al. |
| 6,167,443 | A | 12/2000 | Decker et al. |
| 6,169,938 | B1 | 1/2001 | Hartsell, Jr. et al. |
| 6,170,060 | B1 | 1/2001 | Mott et al. |
| 6,182,126 | B1 | 1/2001 | Nathan et al. |
| 6,182,128 | B1 | 1/2001 | Kelkar et al. |
| 6,192,340 | B1 | 2/2001 | Abecassis |
| 6,192,416 | B1 | 2/2001 | Baxter |
| 6,201,540 | B1 | 3/2001 | Gallup et al. |
| 6,202,008 | B1 | 3/2001 | Beckert et al. |
| 6,202,056 | B1 | 3/2001 | Nuttall |
| 6,204,840 | B1 | 3/2001 | Petelycky et al. |
| 6,209,048 | B1 | 3/2001 | Wolff |
| 6,212,359 | B1 | 4/2001 | Knox |
| 6,212,555 | B1 | 4/2001 | Brooks, Jr. et al. |
| 6,232,539 | B1 | 5/2001 | Looney et al. |
| 6,233,506 | B1 | 5/2001 | Obradovich et al. |
| 6,240,185 | B1 | 5/2001 | Van Wie et al. |
| 6,243,328 | B1 | 6/2001 | Fenner et al. |
| 6,243,692 | B1 | 6/2001 | Floyd et al. |
| 6,248,946 | B1 | 6/2001 | Dwek |
| 6,253,122 | B1 | 6/2001 | Razavi et al. |
| 6,269,394 | B1 | 7/2001 | Kenner et al. |
| 6,278,976 | B1 | 8/2001 | Kochian |
| 6,295,555 | B1 | 9/2001 | Goldman |
| 6,301,513 | B1 | 10/2001 | Divon et al. |
| 6,308,204 | B1 | 10/2001 | Nathan et al. |
| 6,311,214 | B1 | 10/2001 | Rhoads |
| 6,314,094 | B1 | 11/2001 | Boys |
| 6,314,573 | B1 | 11/2001 | Gordon et al. |
| 6,317,779 | B1 | 11/2001 | Gile et al. |
| 6,324,182 | B1 | 11/2001 | Burns et al. |
| 6,330,334 | B1 | 12/2001 | Ryan |
| 6,330,490 | B1 | 12/2001 | Kim et al. |
| 6,330,675 | B1 | 12/2001 | Wiser et al. |
| 6,332,163 | B1 | 12/2001 | Bowman-Amuah |
| 6,928,433 | B2 | 8/2005 | Goodman et al. |
| 2002/0133491 | A1 * | 9/2002 | Sim et al. ............... 707/10 |
| 2002/0144277 | A1 * | 10/2002 | Friedman et al. ......... 725/89 |

FOREIGN PATENT DOCUMENTS

| | | |
|---|---|---|
| JP | 2001-266470 | 9/2001 |
| JP | 2001-266551 | 9/2001 |
| WO | WO 97/05616 | 2/1997 |

OTHER PUBLICATIONS

Microsoft Corporation, "Microsoft Press Computer User's Dictionary", May 20, 1998, Microsoft Press (copyright data page and p. 174).*

PCT International Search Report, dated May 4, 2003.

How to Use and Enjoy Your Treo™ 10 Digital Music Jukebox. Document marked "© 2001 e.Digital Corporation." 56 pages. A copy of this document was given to the inventor by e.Digital Corporation in Dec. 2001.

Preliminary Treo Jukebox UI Specification document marked "Confidential" with date "Feb. 15, 2001." Documentation also bears "Revision History" identifying "Revision 1.0" with date "Dec. 1, 2000."

E-mail exchange relating to item #2 above, dated Aug. 9, 2004.

* cited by examiner

PROGRAMMING, SELECTING, AND PLAYING MULTIMEDIA FILES

CROSS REFERENCE TO RELATED APPLICATION

This application is related to and claims the benefit of the filing date of U.S. provisional application Ser. No. 60/338,440, filed on Dec. 6, 2001, entitled "Vehicle Player System and Method Using Downloaded Multimedia Files," the contents of which are incorporated herein by reference.

BACKGROUND OF THE INVENTION

1. Field of the Invention

The invention relates to multimedia file storage, access and retrieval. More specifically, the invention relates to systems and methods for creating multimedia file libraries from which individual multimedia files can be easily accessed and played.

2. General Background and State of the Art

There is strong interest in entertaining during vehicle travel. However, these are difficulties that are not usually present when entertaining and travel are engaged in separately. One particular problem involves safety. A driver needs to be able to select and play a song in his car while driving, without having to significantly divert his attention from driving. This problem multiplies as the number of selections increases.

It is also desirable to allow a driver to create his own set of entertainment offerings. However, a user programmable feature is often complex to operate. This can also increase the safety concerns discussed above. Examples of these are described in U.S. Pat. No. 5,625,608 to Grewe and U.S. Pat. No. 6,232,539 to Looney. Both include a plurality of separate buttons, some configured for user-programmable features, some configured for user-selection features, and still others configured for playback features. The control taught by Grewe includes soft keys for selecting categories of music, musical artists or specific songs. It requires clicking through multiple selection levels to make a selection and to then play the selection. Looney includes selector buttons to which song files are mapped and which are configured to subsequently select a song, and a separate button to play the selected song. All of the different buttons, with different features, are difficult for a driver to safely operate while driving his car.

INVENTION SUMMARY

The present invention helps solve these and other problems by providing a multimedia selection and playback system that includes a single set of buttons configured to (a) have multimedia files mapped to them, (b) be activated by a user to select a mapped multimedia file, and (c) be activated by the user to play the selected multimedia file. The use of a single set of buttons for the above plurality of user actions provides a safer mechanism by which a driver can select multimedia files for entertainment on a simply designed console. Moreover, because the same single set of buttons can be used to navigate through and select the multimedia files, users are given the ability to create their own multimedia library of entertainment selections without requiring additional buttons features or a more-complex multimedia console in his vehicle.

Embodiments of the invention include a vehicle multimedia player system and method that utilize downloaded multimedia or other digital files selected and organized by a driver. The multimedia or digital player is installed or placed in a vehicle such as, for example, an automobile. The multimedia player stores, reads and plays files including, but not limited to, MP3 audio files, MPEG video files and the like. The individual multimedia files are stored on a hard disk that is located within or operatively communicative with the multimedia player. Each multimedia file may contain music, entertainment, educational material, promotional material or other various types of multimedia or other digital content.

In addition to storing files, the player includes selector buttons or other types of user-actuated controls. The selector buttons may be, for example, mechanical buttons or touch-screen operated buttons. Each selector button is mapped to an individual multimedia file or to a group of such files. When mapped to a group of files, for example, the group might consist of musical tracks from a particular music genre, or a customized play list created by the user, including lists that comprise musical tracks of different artists or different genres.

Another exemplary feature of the player is that it previews files for a user before they are selected or played. Upon activation of one of the user-actuated controls, such as depression of a button, information about the file or group of files that are mapped to the button is displayed. For example, information associated with a particular musical track may include the song's title and artist. While the information is displayed upon a display screen on the player, any current file being played is not affected. Instead, the exemplary file awaits a further signal from the user, such as a subsequent activation of the same user-actuated control, which sends a message to the player to discontinue playback of the current file and commence playback of the newly selected file or group of files. Upon receipt of this "play" signal, the selected file is played, or if the button was assigned to a group of files, that group of files is played in sequence.

In one aspect of the invention, a method for selecting and playing a multimedia file includes selecting a file from a library of multimedia files, each multimedia file within the library being associated with a description and with a unique coordinate including a plurality of axis values. The selecting is accomplished by activating at least one of a set of user-operated controls, each assigned to an axis different from the axes to which the other user-operated controls are assigned, wherein the activating causes a selection of a value on the axis to which said user-operated control is assigned. The method further includes viewing the description associated with the multimedia file whose axes values are selected by said user-operated controls as it appears on a display system, accepting the multimedia file that is displayed on said display system, and playing the multimedia file that is accepted by the selection-acceptance system on a multimedia player system.

In another aspect of the invention, a multimedia player for playing a selected multimedia file includes a selection system for selecting a multimedia file to be played from a library of multimedia files, each multimedia file within the library being associated with a description and with a unique coordinate including a plurality of axis values. The selection system also includes a set of user-operated controls, each assigned to an axis different from the axes to which the other user-operated controls are assigned and configured to allow a user to select a value on the axis to which said user-operated control is assigned. The selection system also includes a display system for displaying the description associated with the multimedia file whose axes values are selected by said user-operated controls. The player further includes a selection-acceptance system for accepting the multimedia file that is displayed on said display system, and a multimedia player for playing the multimedia file that is accepted by said selection-acceptance system.

In another aspect of the invention, computer-readable media contains instructions executable by a computer that, when loaded and executed on a computer, program a multimedia player with a library of multimedia files, including selecting a multimedia file having a description from a catalog of multimedia files, assigning a unique coordinate to the selected multimedia file, the unique coordinate comprising a plurality of axis values, repeating the steps of selecting and assigning one or more times to select other multimedia files, creating a library of the selected multimedia files and their coordinate values, and downloading the library into the multimedia player.

In yet another aspect of the invention, a method for selecting and playing a multimedia file with a set of buttons includes selecting a multimedia file from a library of multimedia files, each multimedia file within the library being associated with a description and with a unique coordinate including a plurality of axis values. The selecting includes the steps of activating at least one of a set of user-operated controls, each assigned to an axis different from the axes to which the other user-operated controls are assigned. The activating causes a selection of a value on the axis to which said user-operated control is assigned. The method further includes viewing the description associated with the multimedia file whose axes values are selected by said user-operated controls as it appears on a display system, activating a button a first time to accept the file that is displayed on said display system, and activating the same button a second time to play the multimedia file that is accepted by the selection-acceptance system on a multimedia player system.

In still a further aspect of the invention, a multimedia player for selecting and playing a multimedia file includes a selection system for selecting a multimedia file to be played from a library of multimedia files, each multimedia file within the library being associated with a description and with a unique coordinate. The selection system comprises a set of user-operated controls arranged in a horizontal row within a standard faceplate layout, wherein each one of the set of user-operated controls is mapped to a portion of the unique coordinate associated with at least one of the library of multimedia files and configured to allow a user to select a multimedia file to which the user-operated control is mapped. The selection system also includes a display screen, disposed above the set of user-operated controls within the standard faceplate layout, for displaying the description associated with the multimedia file selected by said user-operated controls, and a selection-acceptance button located within the standard faceplate layout and configured for accepting the multimedia file that is displayed on said display screen. A multimedia player plays the multimedia file that is accepted by said selection-acceptance button.

The foregoing and other objects, features, and advantages of the present invention will become apparent from a reading of the following detailed description of exemplary embodiments thereof, in conjunction with the accompanying drawings.

DETAILED DESCRIPTION OF ILLUSTRATIVE EMBODIMENTS

Although the description includes references to "multimedia files" and "multimedia players" in various exemplary embodiments, it is to be understood that the invention is not limited to a specific file format. For example, embodiments of the invention described herein may also utilize other types digital or analog files. Therefore, the invention is not limited to use with "multimedia" files or "multimedia players," and such references are illustrative only.

In an exemplary embodiment of the invention, a user creates a multimedia library that is customized according to his content and organizational preferences. Individual files within the library can then be easily accessed by him while he is driving or otherwise engaged, by taking advantage of the unique and personalized organizational structure that he created and implemented during the library creation process.

Figure 1:
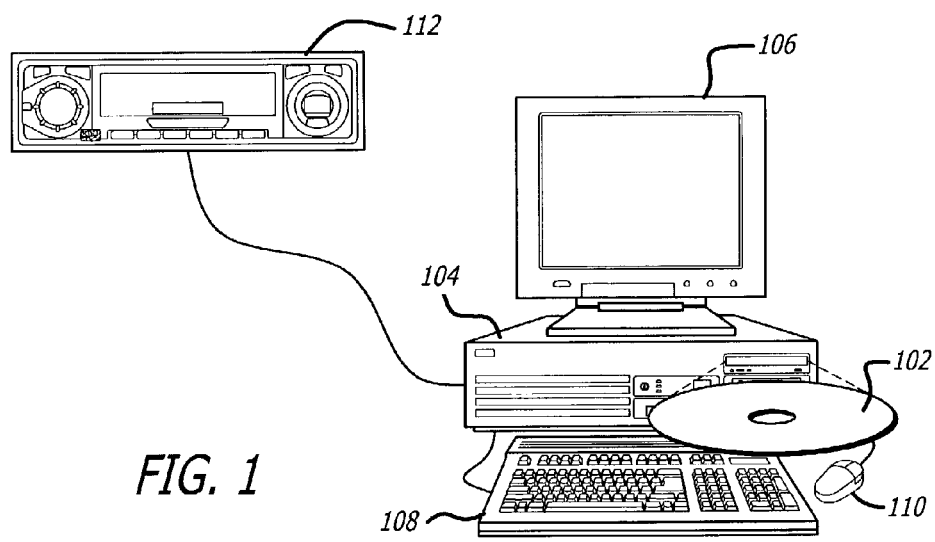
FIG. 1 illustrates an embodiment of a software-based user configuration system in accordance with one embodiment of the invention.

FIG. 1 illustrates an exemplary software-based user configuration system for creating such a multimedia library. Software is embodied in a CD-Rom 102 or other computer-readable media and is loaded onto a computer 104. The software includes a program to perform a method of creating a library. When loaded and executed by computer 104, the software enables a user to access multimedia file catalogues and select individual files therefrom, such as digital multimedia files, to create a library. The process may be implemented using a graphical user interface displayed upon a computer monitor 106. For example, a visual file system may be presented to the user, with drag-and-drop features for transferring files from a catalogue to the customized library. Or, for example, dialogue boxes may receive input from the user, regarding which files from the catalogue are to be copied to which specific location within the library. These and similar methods, which will be readily apparent to those skilled in the art, allow the user to conveniently select multimedia files, associate descriptions therewith, and assign unique coordinates thereto, using a keyboard 108, mouse 110, or other computer input device. The software may also be configured to assign an organizational structure to available storage space on the multimedia player, such as in a three dimensional matrix or as a library of files. Illustrative embodiments of the library creation method and the organizational structure will be described in further detail below, with respect to FIGS. 2 and 3.

Continuing with a description of FIG. 1, after a library has been created and established by a user, it is downloaded to the multimedia player 112. The multimedia player 112 may be directly connectable to computer 104, such as with a USB or other connection mechanism. Alternatively, the multimedia library may be stored on a CD-Rom or other storage media readable by both computer 104 and multimedia player 112. In yet another contemplated embodiment of the invention, the multimedia library is stored on a flash memory card or other compact solid state storage device, and the multimedia player 112 includes a slot for receiving the compact storage device and transmitting the multimedia library contained thereon to the local storage of the multimedia player 112. Once the multimedia library is downloaded to the multimedia player 112, and the multimedia player 112 is programmed with the library of multimedia files, those files are readily accessible and playable by a driver in whose car the multimedia player 112 is installed or placed.

Figure 2:
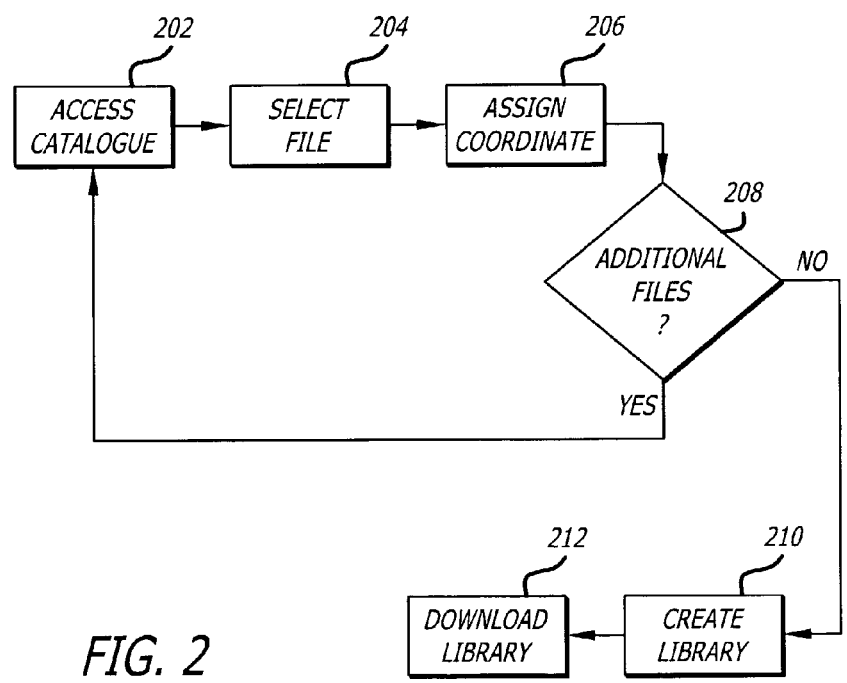
FIG. 2 is a flow diagram illustrating an exemplary method of programming a multimedia player with a library of multimedia files in accordance with one embodiment of the invention.

FIG. 2 is a flow diagram illustrating an exemplary method of programming a multimedia player with a library of multimedia files. First, at block 202, a user accesses a catalogue of available multimedia files. The catalogue may be located, for example, on a computer, on an external hard drive, on a portable MP3 player, on a music CD, or other storage device. Alternatively, the catalogue may be located on a Website that is accessible to users, such as through a subscription or other form of membership access. Yet another embodiment involves the storage of the catalogue on portable magnetic medium, such as compact flash memory and the like.

From the accessed catalogue, the user selects a file he wishes to include in his library, as indicated at block 204. Then, the user assigns a unique coordinate, at block 206. For example, the user may have organized the storage space available on the multimedia player into a three dimensional array as described above. In that case, an X-axis, Y-axis and Z-axis value are assigned to the multimedia file according to the music categories of the defined storage space array. Alternatively, if the storage space has been organized according to a folder structure, the assigned coordinates will reflect folder numbers, placing the selected multimedia file into the proper folder within the storage space. In either case, the assigned coordinates are unique, such that each multimedia file within the user's library has a unique coordinate. At a decision block 208, the user determines whether additional multimedia files are to be included in the library. If so, the process begins again at block 202, where another multimedia file may be selected from the same catalogue or a new catalogue may be accessed.

The process continues until a library of multimedia files has been created, as indicated at block 210. In one embodiment the selected multimedia files have been assigned coordinates according to 3D axis, folder identifications, or the like. Each of the selected multimedia files, and its associated coordinates, may also be associated with a description. Similarly, each axis or folder may be associated with a description. The collection of selected multimedia files, associated unique coordinates and associated descriptions forms the multimedia library. The multimedia library may include additional items such as, for example, play lists containing instructions to play certain ones of the selected multimedia files within the multimedia library, including instructions to play those certain multimedia files in a particular, user-specified order. Finally, at block 212, the multimedia file is downloaded to the multimedia player. This could be by a connection between the computer and the multimedia player, such as a USB or other data transmitting connection. Other mechanisms that can be utilized to download the multimedia file to the multimedia player include, but are not limited to, memory cards receivable in a slot on the multimedia player, or wireless transmission between a computer and the multimedia player. Wireless transmission may utilize Bluetooth or other transmission protocols, or may utilize cellular satellite infrastructures. Moreover, downloading may be achieved indirectly, by transferring files from a computer to an intermediary storage device, and then from the intermediary storage device to the multimedia player.

As previously described, the multimedia player utilizes a unique three dimensional (3D) storage and selection system in one embodiment. The system allows the user to select any desired multimedia file from a very large library of stored files, by selecting from among a vastly smaller number of choices, embodied as 3D coordinates. This feature requires that each multimedia file stored in the multimedia player have a unique coordinate assigned to it.

Figure 3:
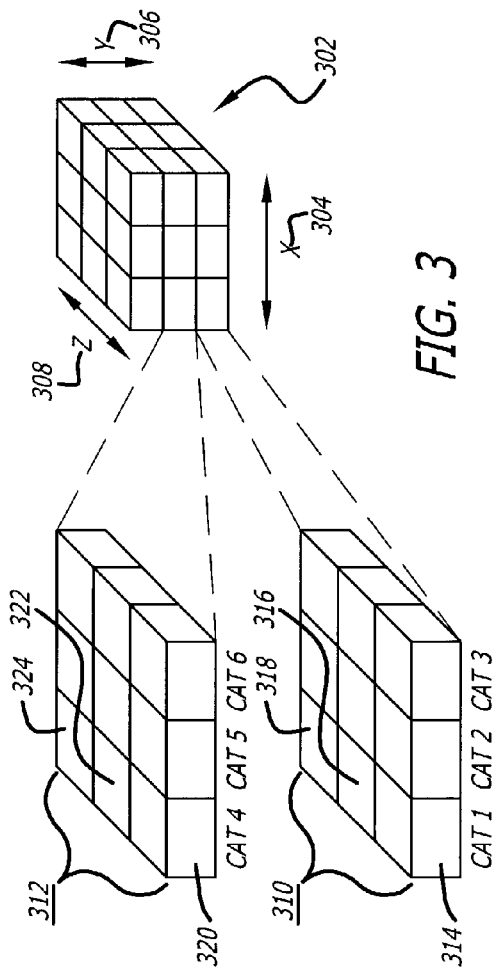
FIG. 3 graphically illustrates a method of assigning a unique coordinate to a multimedia file in accordance with one embodiment of the invention.

FIG. 3 graphically illustrates a method of assigning a unique coordinate to a multimedia file, previously described at block 206 in FIG. 2. Each file is associated with a unique "X," "Y," and "Z" coordinate within a three dimensional array, shown generally at 302. The three dimensional array 302 comprises individual blocks, each representing a multimedia file, and has an X-axis 304, a Y-axis 306 and a Z-axis 308. The multimedia files may be organized into categories by a user. For example, categories may be established to represent genres of music, particular artists, specific albums, eras of music, and the like.

In an exemplary embodiment wherein the multimedia files are musical tracks, the X-axis allows a user to access groups of music categories. For example, the first position on the X-axis 304 gives the user access to a group of music categories including a first category (CAT 1) 310, a second category (CAT 4) 312, and other first-position X-axis music categories not shown in expanded view in FIG. 3. Within each music category are individual multimedia files containing songs that belong to that music category. For example, the first music category 310 includes three multimedia files 314, 316, 318, each representing a song belonging to the group defined as first music category 310.

The Y-axis 306 allows a user to access different rows of music categories within the group of categories previously selected along the X-axis 304. For example, by selecting the first position on the X-axis 304, as described above, the user would have access to a group of categories including the first category 310 and the second category 312. Then, by selecting a value along the Y-axis 306, the user selects one category within that group. Thus, if the user selects the second position on the Y-axis, he selects the second category 312.

Finally, by making a selection along the Z-axis 308, the user selects one song within the previously selected category. Continuing with the above example, second music category 312 includes three multimedia files 320, 322, 324, each representing a song. Thus, by selecting one position along the Z-axis 308, the user selects one of those songs. For example, by selecting the third position along the Z axis, song 324 is selected.

The above description exemplifies how the unique 3D coordinates are utilized to organize individual songs and subsequently select those songs from their organized structure. It also helps describe how the unique 3D coordinates should be assigned to each multimedia file. In building a library of multimedia files, a user organizes storage space into a three dimensional array according to user-defined music categories. Categories may be defined, for example, according to musical genre, artist, or other broad descriptor. Of course, for other types of multimedia files, other types of categories may apply. Upon establishing X-axis and Y-axis coordinates for music categories, the user must then identify which of the music categories applies to each song he desires to place in the library. Each song is assigned an X-axis and Y-axis value to place it in the proper music category within the three dimensional array of storage space, and then the user assigns a Z-axis value to it, assigning its particular memory location within its proper music category. Organizing the multimedia files of the library in this 3D structure, wherein each individual block represents an individual multimedia file and has its own unique coordinate as defined by the user, allows the user to subsequently select individual multimedia files with relative ease, using a single set of buttons to select and play the files.

Figure 4:
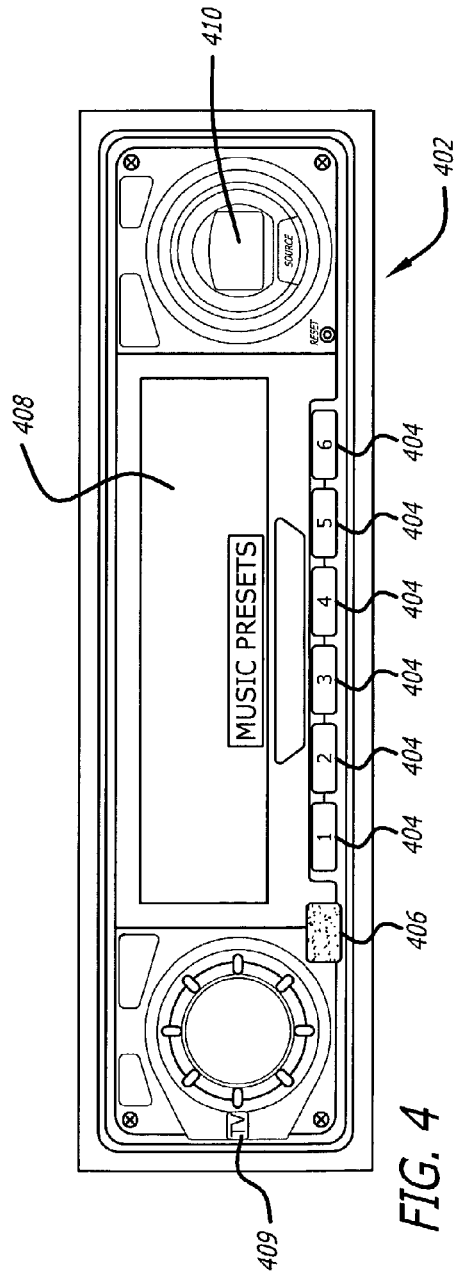
FIG. 4 illustrates an exemplary multimedia player in accordance with one embodiment of the invention.

FIG. 4 illustrates an exemplary multimedia player, visible as a faceplate on a vehicle dashboard, for example. The multimedia player, shown generally at 402, includes standard radio features, as will be recognized to those skilled in the art. The exemplary multimedia player also includes a set of buttons 404, used to select multimedia files that have been mapped to the 3D coordinates assigned by the method described above. Each button may be associated with an axis of the three dimensional matrix of storage space. In that case, each of the six buttons 404 represents one value along the X axis. A single button 406 represents the Y axis and can be held down or pressed repeatedly to select different values along the Y axis, and a button 409 similarly represents values along the Z axis. Buttons 406 and 409 may be "rocker" buttons having two directions, such that pressing the button in one direction causes values along that button's respective axis to increase, while pressing it in the other direction causes the values to decrease. In yet another embodiment, buttons 406 and 409 may be voice activated "buttons" that can be operated by a user's voice in lieu of being physically depressed. By issuing a statement, word, or other verbal command, the voice activated button is actuated. Voice commands may cause a particular value to be selected with a button, such as by identifying one of the six buttons 404, for example. A voice command may also activate a button in a fashion similar to that of a rocker button, so as to cause an increase or decrease in the value along an axis. It is to be understood that buttons 404 can also be rocker, voice activated, or other styles of buttons.

By using each of the axis-specific buttons, the user can navigate through the storage space to select a specific file. As described above, when the user created the multimedia library, he organized the storage space of the multimedia player according to categories. For example, the user may organize the storage space such that the X axis represents genre of music, the Y axis represents names of bands or musicians within that genre, and the Z axis represents specific songs performed by the band or musician. In that case, the user could select a musical genre by pressing one of the X axis buttons 404. From there, the user could select a band within the selected genre by activating the Y axis button 406 to select the value associated with that band. Finally, a specific song performed by the selected band is chosen by activating the Z axis button 409 to select the value assigned to that song. Of course, the user is able to organize the storage space according to any organizational nomenclature or hierarchy, and the categories described above are illustrative only.

In another exemplary embodiment, each of the axes may be represented by one such single button, rather than any axis having a plurality of value-specific buttons. Or, each button may be associated with all of the axes, and represent a value on each of the axes. For example, in the six button exemplary arrangement of FIG. 4, each of the six buttons would represent one of six values on each of the axes. Or, a combination of the six buttons and a shifting key, which could be key 406, for example, could represent more than six values on an axes. For example, when selecting a value for any one axis, the shifting key 406 is depressed to include six additional values (7-12) beyond the original six values (1-6) offered by the six buttons in their un-shifted mode, and so forth. Alternatively, each button may be associated with a music folder, wherein each music folder includes multimedia files of a particular music category. In any case, the user establishes his music library accordingly, and then selects individual songs or play lists from within the three dimensional storage space matrix or the music folders by activating one or more of the buttons 404.

In yet another configuration, to access various dimensions that are accessible within a single button, a shifting key 406 may be depressed. Activating the shifting key 406 changes the mode of a button to a different axis or, alternatively, causes the button to be able to access different folders. For example, six buttons 404 are included in the exemplary multimedia player. These six buttons 404 may be used to access six music folders (1-6), and six additional music folders (7-12) by activating the shifting key once, and six additional music folders (13-21) by activating the shifting key again, etc.

In a variation of the above embodiments, the X-axis value is selected by pressing one of the set of buttons 404. Then, the Y-axis value is selected by choosing a mode for the set of buttons 404 with the shifting key 406. Finally, the Z-axis value is selected by using button 409 to a select a specific song within that mode. For example, an X-axis value of "3" may be selected by pressing the "3" button within the set of buttons 404. Then, a Y-axis value of "2" may be chosen by pressing the shifting button 406 once or, as another example, a Y-axis value of "1" may be chosen by not pressing the shifting button 406 at all. Finally, after the Y-axis value is chosen, the Z-axis value is chosen by again pressing the button 409 in an appropriate fashion. For example, a Z-axis value of "4" would be chosen by pressing the button 409 three times, or the default Z-axis value of "1" would be chosen by not pressing the button 409 at all. Finally, button 410 is depressed to accept the final selection, and to cause it to be played. In any of the above described embodiments, as well as other possible embodiments, the same set of buttons 404, 406, 409 and 410 are used to select a multimedia file, accept a selection whose description is viewed on display screen 408 and to subsequently play the selected multimedia file. It is to be understood that many other button configurations and selection processes are possible and contemplated as being within the scope of the present invention. It will be recognized by those skilled in the art that the single set of buttons for selecting and playing individual multimedia files can be arranged and utilized in numerous fashions for the purpose of performing the method of selecting and playing a multimedia file. Other types of buttons may be used as well. In addition to mechanical and touch screen buttons, toggle buttons or levers may be utilized. For example, although the number of "X" dimension blocks on any particular "Y" dimension level within a 3D array of storage blocks would be limited in the above exemplary embodiment to the number of buttons 404 present on the player 402, the "Y" and "Z" dimensions would be unlimited (except as to the amount of storage space available). Therefore, a toggle button or a lever may be employed for button 406, or button 409, or both, such that when it is held down or held in one of two directions, the value for the "Y" dimension or the "Z" dimension increases or decreases continuously until the button is released.

As will be recognized by those skilled in the art, the multimedia player shown generally at 402 employs an exemplary standard faceplate layout, with which automobile drivers may be commonly familiar. In various embodiments of the invention, the existing button locations of a standard faceplate layout are utilized for purposes other than their standard uses, which commonly include selecting a preprogrammed radio station for example. By assigning new functionality associated with customized multimedia library access and selection to the standard buttons, various embodiments of the present invention provide a familiar and easy-to-use mechanical architecture for users. Therefore, because a user may already be familiar with the usual positions of various buttons within the standard faceplate layout, only the new functions associated with those buttons need be learned by him in order to access his customized multimedia library.

In an exemplary embodiment that utilizes the standard faceplate layout, a multimedia player for selecting and playing a multimedia file includes a selection system for selecting a multimedia file to be played from a library of multimedia files, wherein each multimedia file within the library is associated with a description and with a unique coordinate, as described above. The selection system comprises a set of user-operated controls 404 arranged in a horizontal row within the standard faceplate layout. Each one of the set of user-operated controls 404 is mapped to a portion of the unique coordinate associated with at least one of the library of multimedia files, such as an X-axis value. Each button 404 is configured to allow a user to select the multimedia file to which it is mapped. The selection system also includes a display screen 408, disposed above the set of user-operated controls 404 within the standard faceplate layout, for displaying the description associated with the multimedia file selected by said user-operated controls, and a selection-acceptance button located within the standard faceplate layout and configured for accepting the multimedia file that is displayed on the display screen 408. The multimedia player may then be directed to play the multimedia file that is accepted, such as by activating a play button 410, also commonly found on the standard faceplate layout.

Figure 5:
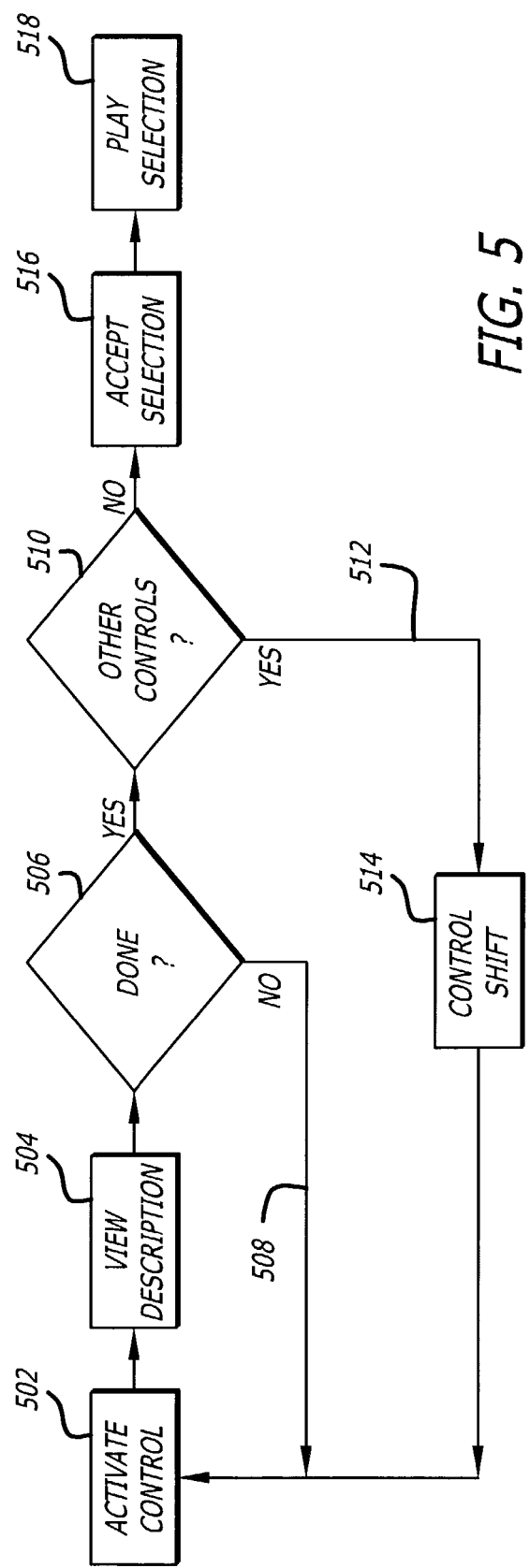
FIG. 5 is a flow diagram illustrative of an exemplary method of selecting and playing a multimedia file, in accordance with one embodiment of the invention.

FIG. 5 is a flow diagram showing an exemplary method of selecting and playing a multimedia file. Beginning at block 502, a user selects a first one of a set of user-activated controls with which to work. Alternatively, there may be only a single user-activated control and a shifting key that operates to place the single user-activated control into different modes. In that case, at block 502, the user selects the first mode for the user-activated control. In either case, the user operates the control to select a value associated with the X-axis of the three dimensional array of storage space described above. Then, at block 504, the user views on a display screen a description of the selected X-axis value. The description may include, for example, a list of music categories represented by the selected X-axis value. At decision block 506, the user determines whether he has selected the correct group of music categories. If not, as indicated by arrow 508, he continues to manipulate the user-operated control at block 502 and view the resultant descriptions at block 504.

Once the correct group of music selections is displayed, the user determines at decision block 510 whether there are other controls to be operated in order to narrow his selection down to an individual song. In a vehicle player system that comprises fewer dimensions than the exemplary three dimensional matrix of storage space described herein as the exemplary embodiment, there may not be other controls to access or further decisions to be made. Otherwise, as indicated by arrow 512, the user shifts to the next user-actuated control or presses a shift key to place the first user-actuated control in a second mode, at block 514. Then, this second user-actuated control is manipulated by the user, at block 502, to make the next selection. For example, a Y-axis value may be chosen in order to select a specific music category within the group of music categories previously selected by the X-axis value determination. This process repeats through each of the X-axis, Y-axis and Z-axis value selections, until a particular multimedia file is identified by its three coordinates. Then, at decision block 510, the user determines that there are no further controls to make selections with and, at block 516, accepts the selection multimedia file. Finally, at block 518, the user instructs the multimedia player to play the selected multimedia file, by pressing one of the group of buttons previously activated to select the multimedia file.

After a file is selected and accepted, the multimedia player commences playback of the song in that file. In an exemplary embodiment, the multimedia player may continue playback of multimedia files in a pre-determined order, using the selected song as its starting point. For example, the multimedia player may begin at the memory location of the selected song, and subsequently access and play songs by proceeding through the remainder of the memory according to a pre-determined pattern. Such a pattern may comprise a sequential progression through the values of each axis, respectively, or may be a sequence that is determined and programmed by the user. The multimedia player may have a default playback sequence, and may also accept a number of user-programmed sequences such that the user can design custom playlists. The multimedia player may also include a randomizing feature, such that it accesses and plays files by randomly accessing the files from memory. Additionally, the multimedia player might have a feature for repeating a single song, or for repeating songs along a single axis. Moreover, the multimedia player may have a default starting coordinate, such that when the player is first activated, it may immediately begin playback of a file without waiting for specific input from the user.

While the specification describes particular embodiments of the present invention, those of ordinary skill can devise variations of the present invention without departing from the inventive concept. For example, a variety of storage configurations may be utilized to the storage space of the multimedia player, which is not limited to arrangement in a 3D matrix or folder schema. Other dimensions could be implemented in organizing the storage space, for example. Also, multimedia files other than music files may be used with the various embodiments of the invention. For example, image or video files may be stored and accessed by the multimedia player. Also, instead of multimedia files, digital audio or video files may be utilized. Moreover, the invention is not limited to use by a vehicle driver. Rather, embodiments of the invention may be implemented for use by vehicle passengers.

I claim:

1. A method for selecting and playing a multimedia file, comprising:
   a) selecting a multimedia file from a library of multimedia files, each multimedia file within the library being categorized by a description and a unique multidimensional coordinate comprising a plurality of axis values, each axis value defining a characteristic of the multimedia content of the file, said selecting comprising:
      (1) Repeatedly activating at least one of a set of user-operated controls, each dedicated to an axis different from the axes to which the other user-operated controls are assigned, each activating causing a different selection of a value only on the axis to which said user-operated control is dedicated; and
      (2) viewing each description associated with the multimedia file whose axes values are selected by said user-operated controls as it appears on a display system;
   b) accepting the multimedia file that is displayed on said display system; and
   c) playing the multimedia file that is accepted on a player system.

2. The method of claim 1 wherein the multimedia file comprises an audio track.

3. The method of claim 1 wherein the multimedia file comprises a digital file.

4. The method of claim 1, further comprising playing additional multimedia files in a pre-determined sequence.

5. The method of claim 1 wherein the coordinate comprises three axes and wherein the user-operated controls comprise three user-operated controls.

6. The method of claim 1 wherein the at least one user-operated control comprises a button.

7. The method of claim 6 wherein the button is a touch-screen button.

8. The method of claim 1 wherein the accepting the multimedia file comprises activating a button.

9. The method of claim 8 wherein the button is a touch screen button.

10. The method of claim 8 wherein the button is a rocker button.

11. The method of claim 8 wherein the button is voice activated.

12. The method of claim 1 wherein the selection of a value comprises selecting an axis value from a group consisting of numbers, letters, names, and category indicia.

13. A multimedia player for playing a selected multimedia file comprising:
 a) a selection system for selecting a multimedia file to be played from a library of multimedia files, each multimedia file within the library being categorized by a description and a unique multidimensional coordinate comprising a plurality of axis values, each axis value defining a characteristic of the multimedia content of the file, said selection system comprising:
  (1) a set of user-operated controls, each:
   (a) dedicated to an axis different from the axes to which the other user-operated controls are dedicated; and
   (b) configured to allow a user to repeatedly select a different value only on the axis to which said user-operated control is assigned as a result of each actuation of said user-operated control;
  (2) a display system for displaying each description associated with the multimedia file whose axes values are selected by said user-operated controls;
 b) a selection-acceptance system for accepting the multimedia file that is displayed on said display system; and
 c) a multimedia player for playing the multimedia file that is accepted by said selection-acceptance system.

14. The multimedia player of claim 13 wherein the multimedia file comprises an audio track.

15. The multimedia player of claim 13 wherein the multimedia file comprises a digital file.

16. The multimedia player of claim 13, further comprising playing additional multimedia files in a pre-determined sequence.

17. The multimedia player of claim 13 wherein the coordinate comprises three axes and wherein the user-operated controls comprise three user-operated controls.

18. The multimedia player of claim 13 wherein each of the user-operated control(s) comprise a button.

19. The multimedia player of claim 18 wherein each button is a touch-screen button.

20. The multimedia player of claim 18 wherein each button is voice activated.

21. The multimedia player of claim 13 wherein the selection-acceptance system comprises a button.

22. The multimedia player of claim 21 wherein the button is a touch-screen button.

23. The multimedia player of claim 21 wherein the button is a rocker button.

24. The multimedia player of claim 21 wherein the button is voice activated.

25. The multimedia player of claim 13 wherein the axis value is selected from a group consisting of numbers, letters, names, and category indicia.

26. A method of selecting and playing a multimedia file with a single button, comprising:
 a) selecting a multimedia file from a library of multimedia files, each multimedia file within the library being categorized by a description and a unique multidimensional coordinate comprising a plurality of axis values, each axis value defining a characteristic of the multimedia content of the file, said selecting comprising:
  (1) repeatedly activating at least one of a set of user-operated controls, each dedicated to an axis different from the axes to which the other user-operated controls are dedicated, each activating causing a different selection of a value only on the axis to which said user-operated control is dedicated; and
  (2) viewing the description associated with the multimedia file whose axes values are selected by said user-operated controls as it appears on a display system;
 b) activating a button a first time to accept the multimedia file that is displayed on said display system; and
 c) activating the button a second time to play the multimedia file that is accepted on a multimedia player system.

27. The method of claim 1 wherein each user-operated control includes a user-actuated surface that is mechanically isolated from the other user-actuated surfaces.

28. The method of claim 27 wherein each actuation of each user-operated control causes an increment or decrement in the value.

29. The multimedia player of claim 13 wherein each user-operated control includes a user-actuated surface that is mechanically isolated from the other user-actuated surfaces.

30. The multimedia player of claim 29 wherein each actuation of each user-operated control causes an increment or decrement in the value.

31. The method of claim 1 wherein each user-operated control includes a user-actuated surface that is mechanically coupled to the other user-actuated surfaces.

32. The multimedia player of claim 13 wherein each user-operated control includes a user-actuated surface that is mechanically coupled to the other user-actuated surfaces.

33. The multimedia player of claim 1 wherein the axis values that may be selected by another of the set of user-operated controls is restricted to the corresponding axis values of the coordinates of the multimedia files in the library that have the corresponding axis value selected by the at least one of the set of user-operated controls.

* * * * *